US012742571B2

(12) United States Patent
Evroni

(10) Patent No.: US 12,742,571 B2
(45) Date of Patent: Sep. 22, 2026

(54) SYSTEM AND METHOD FOR HEATING WATER WITH SOLAR ENERGY

(71) Applicant: AXION LTD., Herzeliya (IL)

(72) Inventor: Yigal Evroni, Herzeliya (IL)

(73) Assignee: AXION LTD., Herzeliya (IL)

( * ) Notice: Subject to any disclaimer, the term of this patent is extended or adjusted under 35 U.S.C. 154(b) by 405 days.

(21) Appl. No.: 18/269,555

(22) PCT Filed: Dec. 27, 2021

(86) PCT No.: PCT/IB2021/062337
§ 371 (c)(1),
(2) Date: Jun. 25, 2023

(87) PCT Pub. No.: WO2022/144749
PCT Pub. Date: Jul. 7, 2022

(65) Prior Publication Data

US 2023/0383996 A1 Nov. 30, 2023

Related U.S. Application Data

(60) Provisional application No. 63/131,336, filed on Dec. 29, 2020.

(51) Int. Cl.
*F24S 10/50* (2018.01)
*F24S 50/80* (2018.01)
(Continued)

(52) U.S. Cl.
CPC ............... *F24S 10/50* (2018.05); *F24S 50/80* (2018.05); *F24S 80/56* (2018.05); *F24S 80/65* (2018.05); *F24S 90/10* (2018.05)

(58) Field of Classification Search
CPC .. F24S 10/50; F24S 20/63; F24S 10/40; F24S 10/80; F24D 3/005; F24D 11/003;
(Continued)

(56) References Cited

U.S. PATENT DOCUMENTS 4,127,102 A * 11/1978 Berman .................. F24S 80/30 126/633
4,279,243 A * 7/1981 Deakin ................. F24S 10/503 126/634
(Continued)

FOREIGN PATENT DOCUMENTS

WO WO-9851973 A1 * 11/1998 ............. F24S 50/80

*Primary Examiner* — Jorge A Pereiro
(74) *Attorney, Agent, or Firm* — Rivka Friedman

(57) ABSTRACT

An assembly including: a central enclosure including: an inner wall that is water-resistant and non-corrosive, an outer wall that is transparent, the inner and outer walls hermetically sealed together to form a watertight compartment defined between the inner and outer walls, an inlet port located on a lower portion of the central enclosure, an outlet port located on an upper portion of the central enclosure, and a solar collector member disposed inside the watertight compartment, the member being disposed between the inner and outer walls; an external glass pane spaced apart from the outer wall and defining an external insulation layer of gas between the external glass pane and the outer wall; and an internal partition spaced apart from the inner wall and defining an internal insulation layer of gas between the internal partition and the inner wall.

14 Claims, 6 Drawing Sheets

(51) Int. Cl.
*F24S 80/56* (2018.01)
*F24S 80/65* (2018.01)
*F24S 90/10* (2018.01)

(58) Field of Classification Search
CPC ............. F24D 17/0015; F24D 19/1042; F24D 19/1057; F24D 19/1075
See application file for complete search history.

(56) References Cited

U.S. PATENT DOCUMENTS

| | | | | |
|---|---|---|---|---|
| 4,282,856 A * | 8/1981 | Stehl | F24S 80/30 126/675 |
| 2010/0170092 A1 * | 7/2010 | Mills | F24S 80/70 29/890.033 |
| 2011/0120452 A1 * | 5/2011 | Miles | F24S 10/80 126/684 |

* cited by examiner 170D
172
170C
174
172
170B
172
170A

SYSTEM AND METHOD FOR HEATING WATER WITH SOLAR ENERGY

FIELD OF THE INVENTION

The present invention relates to the field of renewable energy in general and the field of converting solar energy into heat energy to heat a liquid in particular.

BACKGROUND OF THE INVENTION

In the contemporary age, humanity is undergoing accelerated and global urbanization processes. The development of prime cities, the reduction of land resources available in city centers along with significant technological developments encourage skyscrapers' construction in cities, both for commerce and residential purposes. These skyscrapers require the use of newly dedicated systems and technologies, for example, pumps for increasing water pressure, complex fire extinguishing systems, emergency generators, and the like.

Given the requirements accompanying skyscrapers' construction, the conventional technology of using a solar system to heat water and the interior of apartments, which is widely used in low-rise buildings and non-skyscraper buildings, is not applicable. This is mainly due to the small roof area of skyscrapers, which does not provide sufficient space for installing solar collectors systems for all the building's occupants, as well as due to the fact the solar systems do not work ideally in cases in which tenants are far from the solar collectors' location.

Accordingly, in skyscrapers, the heating of water and apartments' interior is done using other energy sources, such as electric or gas-based heating systems.

Another aspect is the architectural aspect of the skyscrapers which emphasizes a flowing design line with modern glass, metal and more cladding panels. This aspect impairs the installation of conventional solar collector panels in the apartment or office space.

SUMMARY OF THE INVENTION

The present innovation provides a solar thermal collector system and method that can be implemented in houses, buildings and even skyscrapers. The solar thermal collector is ideal for cladding modern high-rise skyscrapers, using the proven technology of solar heating. The solar thermal collector is configured to be integrated into, and used as part of, the generally transparent outer facade of buildings and other structure, providing an aesthetic appearance of a dark, clear, glass finish. A wide range of collector panels, from opaque black panels to semi-transparent panels, in different styles, such as shutters, openings, Brise-Soleil, and the like are adapted to fulfill their designated function while preserving an aesthetic finish that blends with the architectural aspect of modern houses, buildings and skyscrapers.

According to the present invention there is provided an assembly for heating water using solar energy, the assembly including: (a) a central enclosure including: (i) an inner wall that is water-resistant and non-corrosive as well as being transparent, semi-transparent, or opaque, (ii) an outer wall that is transparent, the inner and outer walls hermetically sealed together to form a watertight compartment defined between the inner and outer walls, (iii) an inlet port located on a lower portion of the central enclosure, (iv) an outlet port located on an upper portion of the central enclosure, and (v) a solar collector member disposed inside the watertight compartment, the member being disposed between the inner and outer walls; (b) an external glass pane spaced apart from the outer wall and defining an external insulation layer of gas between the external glass pane and the outer wall; and (c) an internal partition spaced apart from the inner wall and defining an internal insulation layer between the internal partition and the inner wall. The internal partition may be transparent, semi-transparent, or opaque.

According to further features in embodiments of the invention the outer wall is a pane of glass. According to still further features in the described preferred embodiments the gas is selected from the including: air, argon, krypton and carbon dioxide. According to further features the assembly further includes at least one additional layer of insulation gas, including a corresponding additional glass partition for each of the at least one additional layer of insulation gas.

According to further features the solar collector member is a planar member of heat conductive material. According to further features the solar collector member is made of metal. According to further features the solar collector member is black in color.

According to further features the solar collector member includes a plurality of apertures formed therein. According to further features the solar thermal collector further includes shutters for shading the plurality of apertures. According to further features the shutters are movable and controlled by a mechanism or system for moving the shutters.

According to further features the external transparent partition is made of glass. According to further features the internal partition has a transparency gradient selected from the group including: transparent, semi-transparent, and opaque. According to further features the inner wall has a transparency gradient selected from the group including: transparent, semi-transparent, and opaque. According to further features the inner wall is made of a material selected from the group including: glass and plastic. According to further features the internal insulation layer includes an insulation medium selected from the group including: gas, fiberglass, mineral wool, cellulose, natural fibers, polystyrene, polyisocyanurate, polyurethane, perlite, cementitious foam, phenolic foam, and insulation facings.

According to another embodiment there is provided a system for heating water using solar energy, the system includes: (a) at least one assembly; (b) a water tank; (c) a hot water pipe extending from the outlet port to a hot water intake disposed on an upper portion of the water tank; and (d) a cold water pipe extending from cold water outlet disposed on a lower portion of the water tank to the inlet port.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a system and method for harnessing solar power to heat water according to the present invention may be better understood with reference to the drawings and the accompanying description.

The present invention is not limited in its application to the details of construction and the arrangement of the components set forth in the following description. The invention is capable of other embodiments, or of being practiced or carried out in various ways. Also, it is to be understood that the phraseology and terminology employed herein is for the purpose of description and should not be regarded as limiting.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Figure 1:
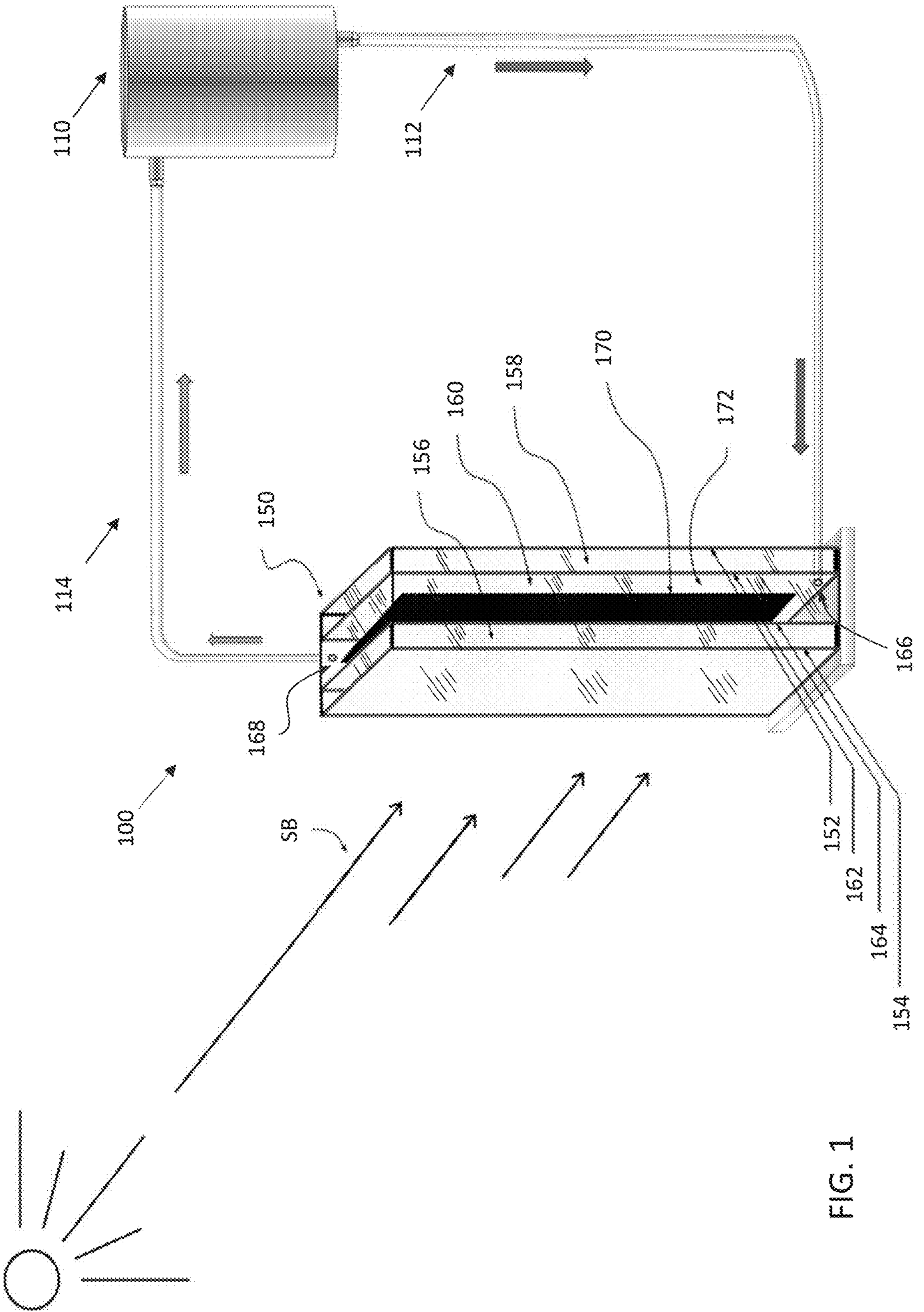
FIG. 1 is a schematic representation of a solar heating system for heating water.

FIG. 1 illustrates a schematic representation of a solar heating system 100 for heating water. The system 100 includes a water tank 110, a solar thermal collector assembly 150 and connecting piping. Cold water runs out of the bottom of the water tank 110, through a pipe, and into the solar thermal collector assembly 110. The colder water is warmed in the assembly 110 and rises out of the assembly, flowing back into the water tank, at the top of the tank. The continuous cycle of water flowing through the assembly and back into the water tank gradually heats the tank.

The assembly 150 for heating water using solar energy is essentially a complex glass window made up of several layers. The assembly 150 includes: a central enclosure 160, an internal partition 152 and an external glass pane 154. The central enclosure 160 includes: an inner wall 162 that is transparent, semi-transparent, or opaque, and an outer wall 164 that is transparent. The inner and outer walls are spaced apart and hermetically sealed together to form a watertight compartment which is defined between the inner and outer walls. The watertight compartment is always filled with water when in use. The internal partition 152 may be a glass pane or any other type of partition (e.g., plastic, plaster, metal, wood, etc.) that is transparent, semi-transparent, or completely opaque.

The walls of the central enclosure/compartment are hermetically sealed except for an inlet port 166 and an outlet port 168. The inlet port 166 is located on a lower portion of central enclosure. The outlet port 168 located on an upper portion of the central enclosure. The exact positions of the inlet and outlet ports may differ between configurations and designs of the assembly. It is made clear that the precise locations of the inlet port and the outlet port are intended to be limiting and the depicted locations are merely examples and not intended to be limiting in any way.

That being said, the inlet port is naturally located somewhere on the bottom portion of the enclosure so that cold water that flows into the enclosure does not cool any of the water that is being heated up inside the compartment, or at least cools the least amount of warmed water. The outlet port is located somewhere in the upper portion of the compartment. The water that is heated inside the compartment rises to the top of the compartment and flows out of the compartment through the piping, via the outlet port. The amount of hot water that leaves the compartment is equal to the amount of cold water that enters the compartment.

An important component of the central enclosure is a solar thermal collector member 170 which is disposed inside the watertight compartment between the inner and outer walls. The solar thermal collector is a thin planar member. The solar collector is interchangeably referred to herein as “a solar collector member”, “a thermal member”, “a solar collector” and any variation and/or combinations thereof. The member 170 is, for example, made from a thermally conductive material and colored in a dark hue. In examples, the thermal member is metallic and blackened. The black color absorbs the sun’s rays, heating the member. The metallic material conducts the heat to the surrounding water, thereby warming the water. Material other than metal can be used and colors other than black can be employed. The larger the thermal member is, referring primarily to the surface area that receives the solar radiation, the more efficiently heat is generated and, accordingly, the more water is warmed and the hotter the water is within the system.

Figure 4:
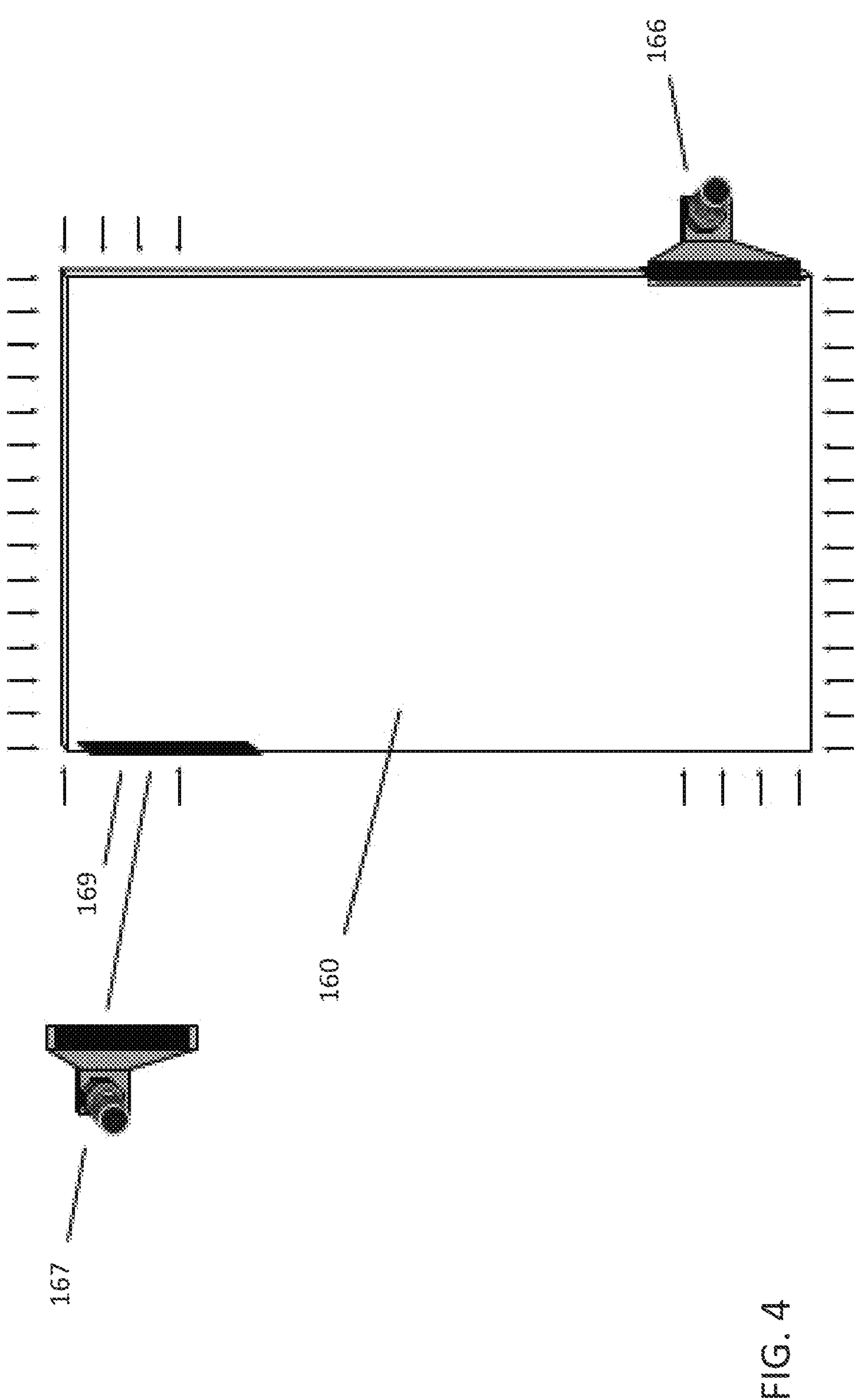
FIG. 4 is a front isometric, inside view of an example of the central compartment 160 according to a fourth configuration.
Figure 5:
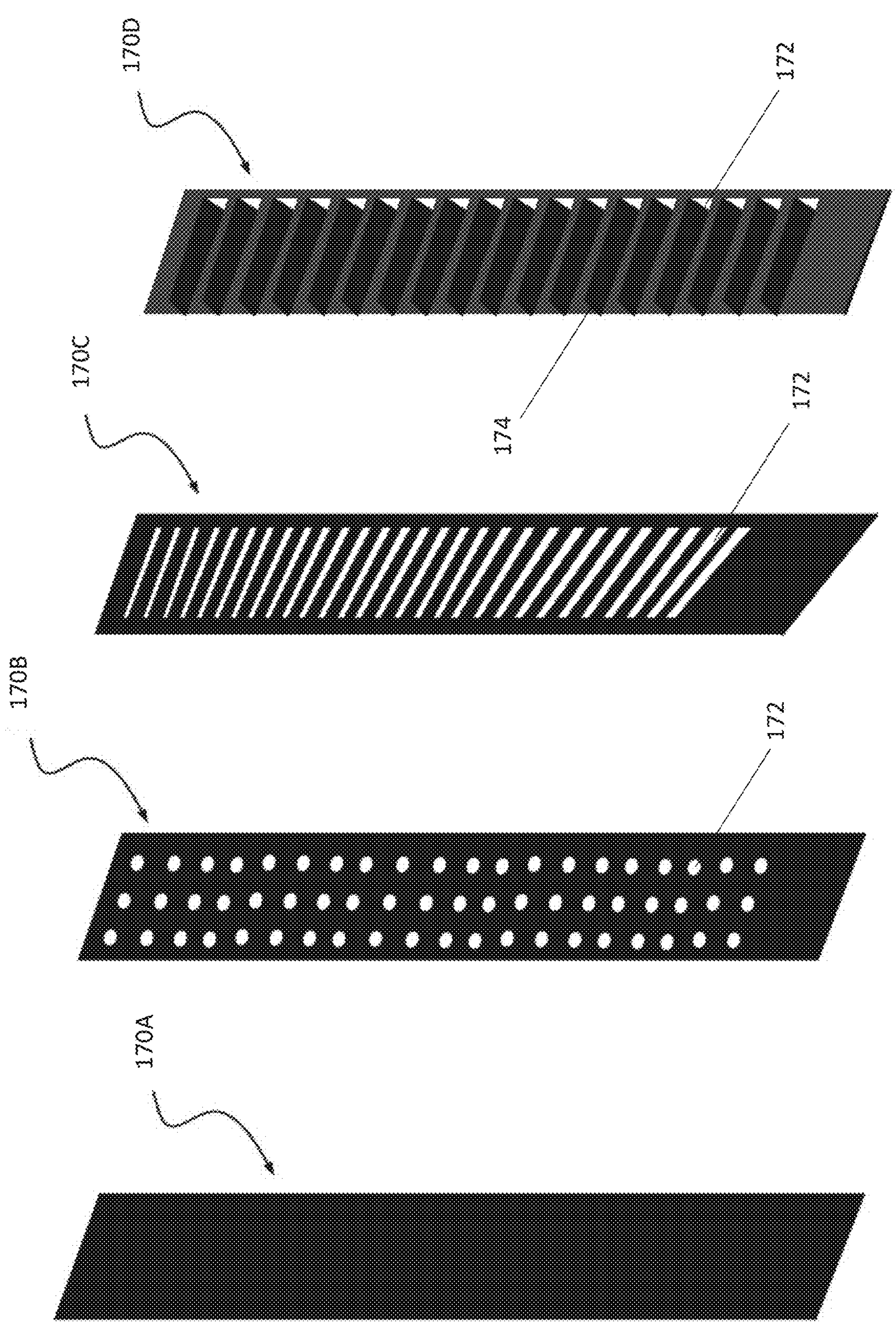
FIG. 5 depicts four example configurations of the solar thermal member 170.

Various examples of alternative configurations 170A, 170B, 170C, 170D and 170E are depicted in FIGS. 4-5. Any reference made to member 170 is intended to relate equally to all of the example configurations as well as configurations and designs not depicted but which are intended to be included within the scope of the innovation. Of course, any structural or functional detail that is cannot be applied to one of the example configurations is to be understood to not refer only to the configuration or configurations to which the detail is not applicable.

The external glass pane 154 is spaced apart from the outer wall 164. The air gap (or other gas) provides an external insulation layer 156 of gas between the external glass pane and the outer wall. The insulation protects the warm water from the outside elements of wind and cold. In some examples, one or more additional insulation layers may be added between the external glass pane and the outer wall of the compartment. Air or gas, such as Argon, Krypton, or carbon dioxide and like servers as the one or more insulating layer or layers. Each layer is separated by a transparent partition such as glass.

In a similar fashion, the internal partition is spaced apart from the inner wall and filled with gas. An internal insulation layer 158 of gas is enclosed between the internal partition and the inner wall. The insulation is aimed to prevent the internal temperature of the room beyond the assembly from affecting the temperature of the water and vice versa. The inner wall and outer wall of the central enclosure may also be panes of glass. Alternatively, the inner wall may be made of some other water-resistant, non-corroding material (e.g., plastic). The inner wall may be transparent, semi-transparent, or opaque. In some examples, additional partitions (e.g., panes of glass, plastic, metal, wood, plaster, etc.) may be provided between the inner wall and the internal partition/glass pane. The additional compartments formed by the partitions are also filled with gas. In cases where the assembly is not intended to be see-through, the internal insulation layer or layers may include regular insulation material such as, but not limited to: fiberglass, mineral wool, cellulose, natural fibers, polystyrene, polyisocyanurate, polyurethane, perlite, cementitious foam, phenolic foam, and insulation facings.

In general, the more layers of insulations, the better the insulation. In example configurations there may be more insulation layers on one side (e.g., external insulation layers) than on the opposing side. The exact configuration of the assembly can be decided based on the specific needs of the building project. The optimal thickness of the gap between the panes (referring to all of the insulation layers described above) depends on the type of gas fill used between the panes. For example, if the gas is air, the optimal gap size is about ½ an inch. If the gas is argon, the optimal gap size is a somewhere between ½ an inch and ⅝ of an inch, depending on the expected outdoor temperatures. If the gas is krypton, the optimal gap size is about $^5/_{16}$ of an inch.

The central enclosure 160 is in communication with the water tank 110 through, for example, pipes 112 and 114. Pipe 112 is configured to transfer liquid from the water tank 110 to the central enclosure 160 via inlet port 166. Pipe 114 is configured to transfer liquid from the central enclosure 160 to the water tank 110.

In operation, cold liquid from the water tank 110 is transferred into the central enclosure through pipe 112, while sunbeams SB penetrate through an external insulation layer 156 into the central enclosure 160 and are absorbed by the thermal member 170. The absorbed solar energy from the sunbeams SB by the thermal member 170 causes the thermal member 170 to heat up. This heat is transferred to the surrounding liquid in the central enclosure, causing the liquid to heat.

Due to the difference in specific gravity of cold liquid and warm liquid (cold liquid has a higher specific gravity value than a warm liquid), the warm liquid migrates to the upper section of the central enclosure 160, whereas the cold liquid migrates to the lower section of the central enclosure 160. The warm liquid is then transferred through pipe 114 from the central enclosure 160 to the water tank 110.

The warm liquid transferred from the central enclosure 160 to the water tank 110 allows for more cold water to enter the central enclosure 160 through pipe 112 based on the circulation of water flow created between the water tank 110 and the assembly 150. The circulation continues for as long as the thermal member 170 absorbs solar energy, which causes the surrounding liquid environment of thermal member 170 to warm up. One or more openings 172 (see for example configurations 170B-170E) are configured to allow viewing through the thermal members while preserving adequate shading and/or provide sufficient surface area for heating the water. The openings 172 can be of different shapes, for example, circular, rectangular, irregular shapes and the like.

According to the instant configuration, cold water pipe 112 extends through the internal partition, through the air/gas gap and into the inlet port 166. Appropriate means are employed to ensure that any opening in the glass is airtight (as well as watertight). The outlet port 168 is disposed in one of the side walls of the central enclosure. The hot water pipe 114 connects to the outlet port. Such a configuration may be possible when the assembly 150 is adjacent a pillar or set inside a wall. When more than one assembly is provided side by side (e.g., to a wide glass façade or glass wall) then the location of the outlet port may need to be changed.

Figure 2:
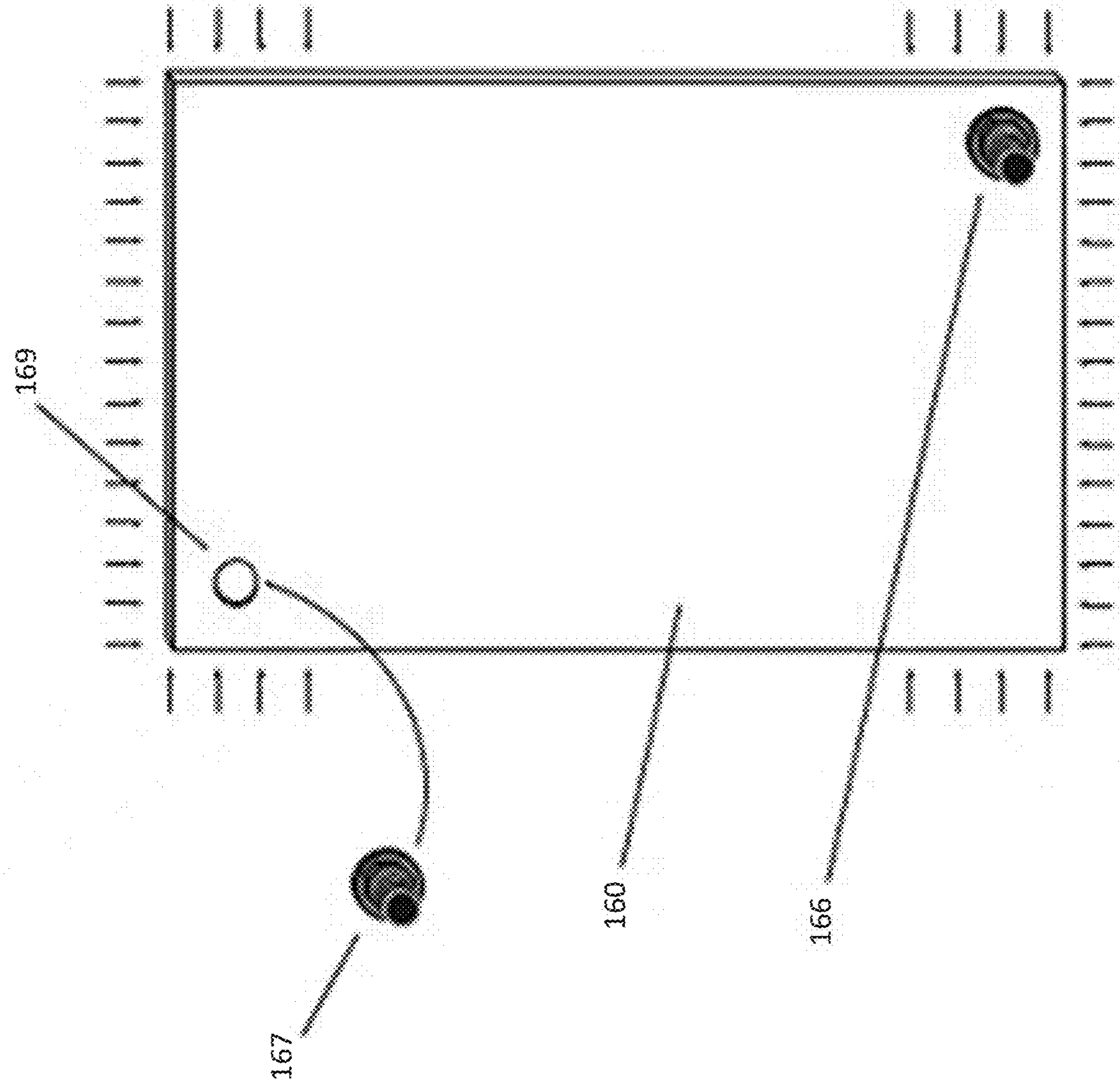
FIG. 2 is a front isometric, inside view of an example of the central compartment 160 according to a second configuration.

Another possible example configuration is shown in FIG. 2. FIG. 2 is a front isometric, inside view of an example of the central compartment 160 according to a second configuration. In the instant configuration, inlet port 166 is depicted in the bottom right corner of the inner wall 162. The outlet port 168 is depicted with an adaptor 167 shown apart from an opening 169. The opening 169 is depicted in the upper left corner of the inner wall 162. Corresponding openings may be formed in the internal partition.

Figure 3:
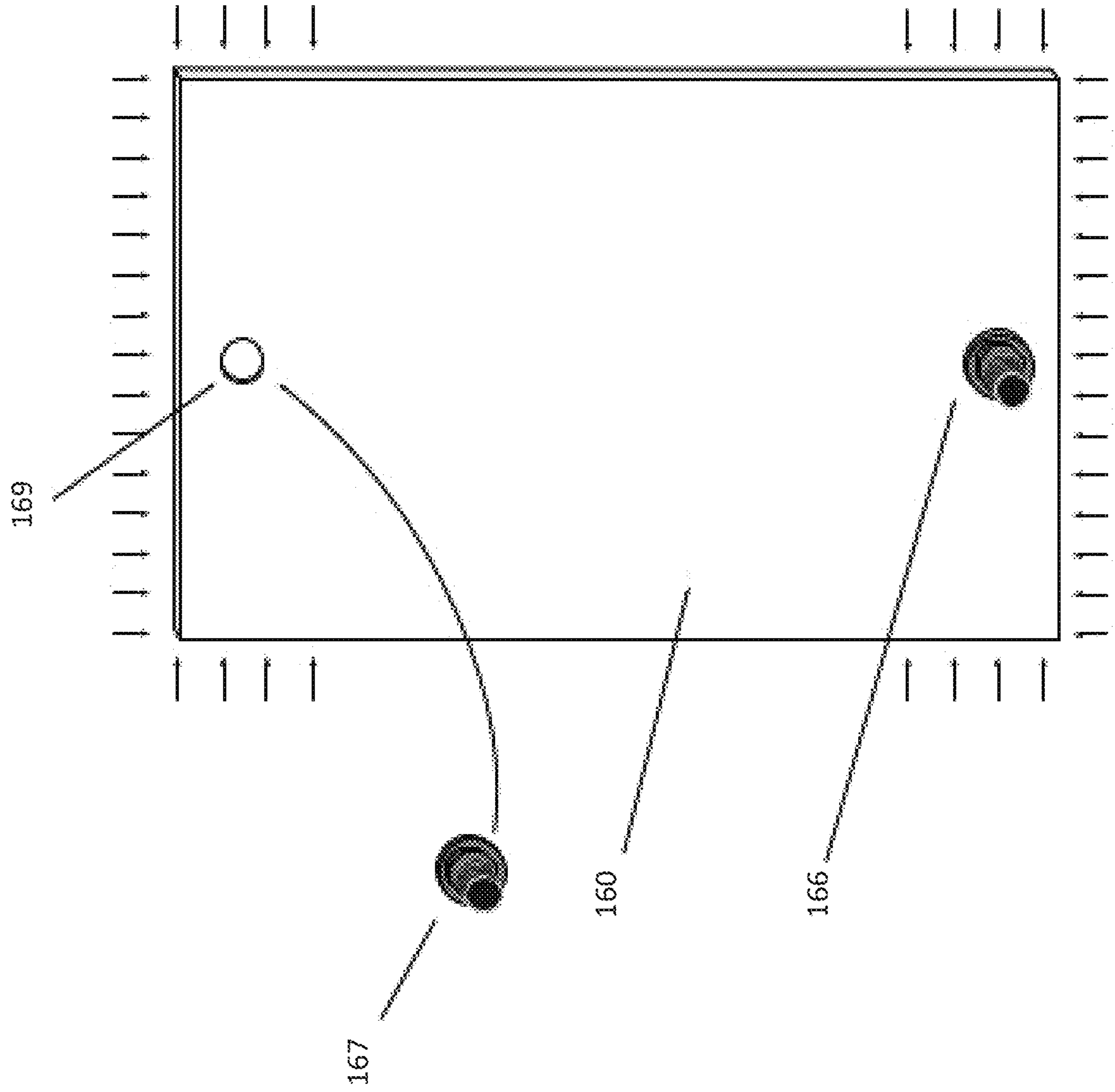
FIG. 3 is a front isometric, inside view of an example of the central compartment 160 according to a third configuration.

Yet another example configuration is shown in FIG. 3. FIG. 3 is a front isometric, inside view of an example of the central compartment 160 according to a third configuration. In the instant configuration, inlet port 166 is depicted in the middle of the bottom portion of the inner wall 162. The outlet port 168 is depicted with an adaptor 167 shown apart from an opening 169. The opening 169 is depicted in the middle of the upper portion of the inner wall 162. Corresponding openings may be formed in the internal partition.

Yet another example configuration is shown in FIG. 4. FIG. 4 is a front isometric, inside view of an example of the central compartment 160 according to a fourth configuration. In the instant configuration, inlet port 166 is depicted in the attached to the side of the central enclosure 160. The outlet port 168 is depicted with an adaptor 167 shown apart from an opening 169. The opening 169 is depicted in the side of the upper portion of the central enclosure 160. Corresponding openings may be formed in the internal partition or in the wall/pillar in which the assembly is installed.

FIG. 5 depicts four example configurations of the solar thermal member 170. Example configuration 170A is a flat rectangular board (e.g., a sheet or plate of metal or the like) with no viewing openings. Example configuration 170B is a flat rectangular board including a plurality of apertures 172, for example, spherical openings 172. Example configuration 170C is a flat rectangular board including a plurality of apertures 172, for example, rectangular openings 172. Example configuration 170C is a flat rectangular board including a plurality of apertures 172, for example, spherical openings 172.

Example configuration 170D includes a plurality of apertures 172, for example, rectangular apertures. In addition, member 170D includes shutters 174 configured to allow viewing through the thermal member while preserving adequate shading.

Figure 6:
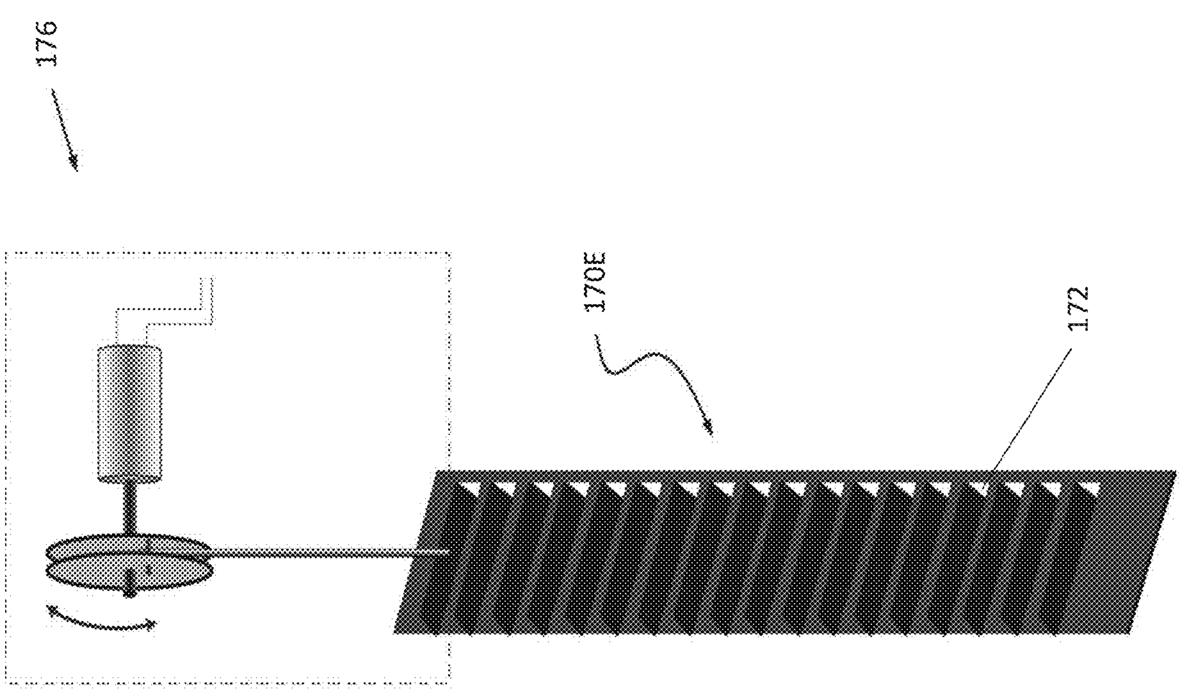
FIG. 6 is a fifth example configuration of the solar member.

FIG. 6 depicts a fifth example configuration of the solar member 170. Example configuration 170E is a flat rectangular board (e.g., a sheet or plate of metal or the like) including a plurality of apertures 172, for example, rectangular openings 172. In addition, member 170E includes shutters 174 configured to allow viewing through the thermal member while preserving adequate shading. Shutters 174 are in communication with a mechanism 176 configured to control the plurality of shutters and move them between an open position, a closed position and any position therebetween. Example mechanism 176 is a mechanized (manual, semi-automated or fully automated) pulley system that raises and lowers the shutters 174. Other mechanisms for controlling the shutters are also to be considered within the scope of the present innovation. For example, system of electromagnets that can be selectively magnetized and demagnetized can be positioned in manner whereby controlling magnetization of the magnets adjusts the position of the shutters.

In some embodiments, a controller (not shown) that controls the movement of the shutters may be programmed to track the movement of the sun (or control the movement of the shutters to coincide with the movement of the sun) to optimize the angle of the shutters to best receive the sunrays and absorb the solar radiation.

As shown in FIG. 1, there is provided a system 100 for heating water using solar energy, the system includes at least one assembly 150. Two or more assemblies can be installed side by side to provide a glass façade or wall. System 100 further includes a water tank for providing hot water. The water tank or hot water tank, in example embodiments, is positioned such that the tank is higher than the assembly. For example, in residential building or skyscraper, the water tank for one apartment may be located on the floor above the apartment.

Gravity and thermal dynamics dictate that cold water runs out of the bottom (or bottom portion) of the water tank and heated water from the assembly rises to the top of the central enclosure and out of the hot water pipe feeding into the top of the water tank. Accordingly, the system 100 further includes a hot water pipe 114 extending from the outlet port 168 of the central enclosure 160 to a hot water intake disposed on an upper portion of the water tank 110. A cold-water pipe 112 extends from a cold water outlet disposed on a lower portion of the water tank 110 to the inlet port 168 of the central enclosure.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. An assembly for heating water using solar energy, the assembly comprising:

(a) a central enclosure comprising:

(i) an inner wall that is water-resistant and non-corrosive, (ii) an outer wall that is transparent, said inner and outer walls hermetically sealed together to form a watertight compartment defined between said inner and outer walls, (iii) an inlet port located on a lower portion of said central enclosure, (iv) an outlet port located on an upper portion of said central enclosure, and (v) a solar collector member disposed inside said watertight compartment, said member being disposed between said inner and outer walls;

(b) an external transparent partition spaced apart from said outer wall and defining an external insulation layer of gas between said external transparent partition and said outer wall; and (c) an internal partition spaced apart from said inner wall and defining an internal insulation layer between said internal partition and said inner wall;

wherein said solar collector member includes a plurality of apertures formed therein, wherein said solar thermal collector further includes shutters for shading said plurality of apertures.

2. The assembly of claim 1, wherein said outer wall is a pane of glass.

3. The assembly of claim 1, wherein said gas is selected from the including: air, argon, krypton and carbon dioxide.

4. The assembly of claim 1, further including at least one additional layer of insulation gas, including a corresponding additional glass partition for each of said at least one additional layer of insulation gas.

5. The assembly of claim 1, wherein said solar collector member is a planar member of heat conductive material.

6. The assembly of claim 5, wherein said solar collector member is made of metal.

7. The assembly of claim 5, wherein said solar collector member is black in color.

8. The assembly of claim 1, wherein said shutters are movable and controlled by a mechanism or system for moving said shutters.

9. The assembly of claim 1, wherein said external transparent partition is made of glass.

10. The assembly of claim 1, wherein said internal partition has a transparency gradient selected from the group including: transparent, semi-transparent, and opaque.

11. The assembly of claim 1, wherein said inner wall has a transparency gradient selected from the group including: transparent, semi-transparent, and opaque.

12. The assembly of claim 1, wherein said inner wall is made of a material selected from the group including: glass and plastic.

13. The assembly of claim 1, wherein said internal insulation layer includes an insulation medium selected from the group including: gas, fiberglass, mineral wool, cellulose, natural fibers, polystyrene, polyisocyanurate, polyurethane, perlite, cementitious foam, phenolic foam, and insulation facings.

14. A system for heating water using solar energy, the system comprising:

(a) at least one assembly of claim 1;

(b) a water tank;

(c) a hot water pipe extending from said outlet port to a hot water intake disposed on an upper portion of said water tank; and (d) a cold water pipe extending from cold water outlet disposed on a lower portion of said water tank to said inlet port.

* * * * *